Jan. 26, 1971　　　　R. H. GRUNDY　　　　3,559,065
PHOTOELECTRIC VELOCITY INDICATOR WITH ZERO
SPEED DETECTION CAPABILITY
Filed Oct. 1, 1968　　　　　　　　　　　　2 Sheets-Sheet 1

Prior Art.　　　　Fig. 1.

INVENTOR.
Reed H. Grundy.
BY W. L. Stout

HIS ATTORNEY

United States Patent Office 3,559,065
Patented Jan. 26, 1971

3,559,065
PHOTOELECTRIC VELOCITY INDICATOR WITH ZERO SPEED DETECTION CAPABILITY
Reed H. Grundy, Murrysville, Pa., assignor to Westinghouse Air Brake Company, Swissvale, Pa., a corporation of Pennsylvania
Filed Oct. 1, 1968, Ser. No. 764,166
Int. Cl. G01p 3/48
U.S. Cl. 324—175                                    20 Claims

ABSTRACT OF THE DISCLOSURE

This invention relates to a signal generator for producing electrical signals in accordance with the angular velocity of a rotating element and includes a rotor, a light-emitting transmitting device, and a transducing device. The rotor possesses optical qualities such that there exists at least one region of low translucence and at least one region of high translucence when in the presence of radiant energy. The light-emitting transmitting device has a pair of input leads upon which is impressed a carrier signal. The transmitting device includes a casing which is positioned adjacent the rotor so that light rays are transmitted through an opening in the casing such that radiant energy signals are produced in accordance with the movement of the rotor. The transducing device also includes a casing which is positioned adjacent the rotor and means for receiving the radiant energy signals through an opening in the casing of the transducing device. The transducing device includes means for converting the received radiant energy signals into corresponding electrical signals which, in turn, are applied to a pair of output leads.

My invention relates to a signal generator for producing electrical signals in accordance with the angular velocity of a rotating element.

More specifically, my invention relates to a signal generator for producing electrical signals and includes a rotor, a light-emitting transmitting device, and a transducing device. The above-mentioned rotor possesses optical qualities such that there exists at least one region of low translucence and at least one region of high translucence when in the presence of radiant energy. The region of low translucence preferably consists of an opaque material.

The above-mentioned light-emitting transmitting device has a pair of input terminals upon which is impressed a carrier signal. The transmitting device includes a casing which is positioned adjacent the rotor so that light rays are transmitted through an opening in the casing such that radiant energy signals are produced in accordance with the movement of the rotor.

The aforementioned transducing device includes a casing which is positioned adjacent the rotor and also includes means for receiving the radiant energy signals through an opening in the casing of the transducing device. The transducing device includes means for converting the received radiant energy signals into corresponding electrical signals which, in turn, are applied to a pair of output terminals.

In the past, vehicle signal generators were of the tachometer type which operated on the principle of the rotating magnet. The magnet was usually coupled to the vehicle axle and normally passed an iron core around which an inductive coil was wound. Accordingly, electrical signals were attained which had amplitudes corresponding to the formula known as Faraday's equation, or law, specifically:

$$e = N\,d\phi/dt$$

where $e$ = voltage or signal amplitude,
$N$ = the number of coil turns,
$\phi$ = magnetic flux linking the coil in webers,
$t$ = time in seconds.

From the above equation it is easily perceived by those experienced in the art that the prior art method is generally acceptable as long as the magnet is rotating at high speeds. Since the output of such a tachometer generator becomes increasingly difficult to detect as rotational speed decreases, due to the very small change in flux with respect to time $d\phi/dt$, there is no practical way of accurately detecting the speed of slowly moving vehicles. This undesirable phenomenon could, of course, be overcome if higher amplitude signals were produced, but this would require that the size of the magnet be greatly enlarged which would complicate the mechanical layout of the generator due to the increased mass. Further, such an arrangement would result in a more expensive, yet still a lower resolution type of device than the present invention. In addition, it will be appreciated that such prior types of signal generators are normally unsafe in that they are capable of failures which simulate zero speed of the vehicle.

Since signal generators are extensively used to determine the speed of moving vehicles, such as, mass and/or rapid transportation, it will be appreciated that security and reliability are of utmost importance to the safety of individuals as well as to the protection of the equipment itself. Additionally, it is of prime significance in such vehicle signal generators that the resolution be optimized, yet that the size and expense minimized while exercising precise speed measurement and detection.

It is therefore an object of this invention to provide an improved signal generator for producing electrical signals which accurately present the actual speed of a vehicle.

Another object of this invention is to provide a new and improved signal generator which is small in size and weight, simple in mechanical layout, as well as economical to construct.

A further object of this invention is to provide a novel signal generator which has a high resolution characteristic and employs a light-emitting transmitting device in combination with a rotor possessing optical qualities such that there exists at least one region of low translucence and at least one region of high translucence when in the presence of radiant energy and a transducing means for converting radiant energy signals into electrical signals.

Another object of this invention is to provide an improved signal generator which presents an output signal at any given speed by uniquely employing a carrier-excited light-emitting diode in combination with a rotor having a varying translucence.

Yet another object of this invention is to provide a novel signal generator having the ability to furnish an indication of zero speed while simultaneously indicating system integrity through the use and presence of a carrier signal which is superimposed on all generator outputs.

Yet another object of this invention is to provide a new and improved signal generator having an output voltage of a fixed amplitude regardless of speed.

In the attainment of the foregoing objects, a carrier-excited signal generator has been devised for accurately producing electrical signals indicative of the speed of a vehicle. The generator basically includes a rotor coupled to the axle of the vehicle, a light-emitting transmitting device for producing radiant energy signals, and a transducing device for converting the radiant energy signals into electrical signals, in combination therewith.

The rotor is preferably a translucent disc having a plurality of opaque regions, of equal angular displacement, lying radially about the circumference of the rotor.

The above-mentioned light-emitting transmitting device transmits radiant energy via a photoconductive transducer which may be a light-emitting diode and includes a casing having an opening through which the radiant energy passes. The transmitting device includes a pair of input leads upon which is impressed a carrier signal for exciting the light-emitting diode. The casing of the transmitting device is positioned adjacent the rotor so that modulated radiant energy signals are produced in accordance with the chopping of the radiant energy by the plurality of opaque regions due to the movement of the rotor, and so that unmodulated radiant energy signals are produced whenever the rotor is motionless.

The aforementioned transducing device includes a casing which is disposed adjacent the rotor. The casing of the transducing device also includes an opening for allowing passage of the radiant energy signals. The transducing device includes means for converting the received radiant energy signals into corresponding electrical signals. The transducing device includes a pair of output leads upon which fixed amplitude modulated electrical signals appear in accordance with the modulated radiant energy signals during movement of the rotor and upon which unmodulated electrical signals appear whenever the rotor is motionless.

Other objects and advantages of the present invention will become apparent from the ensuing description of illustrative embodiments thereof, in the course of which reference is had to the accompanying drawings in which:

FIG. 1 illustrates a prior art type of magnetic signal generator.

FIG. 1a graphically illustrates two different output waveforms produced by the prior art signal generator of FIG. 1.

A description of the above embodiments will follow and then the novel features of the invention will be presented in the appended claims.

Figure 1A:
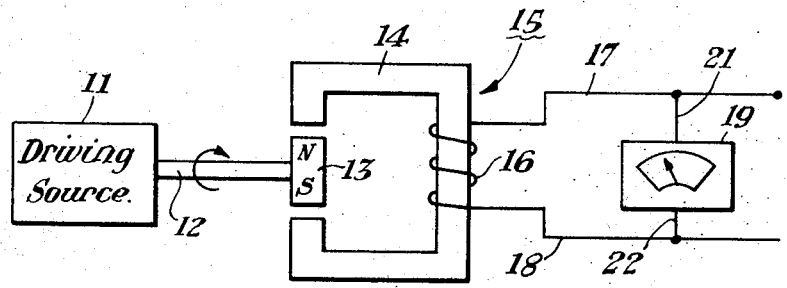
Figure 1A:
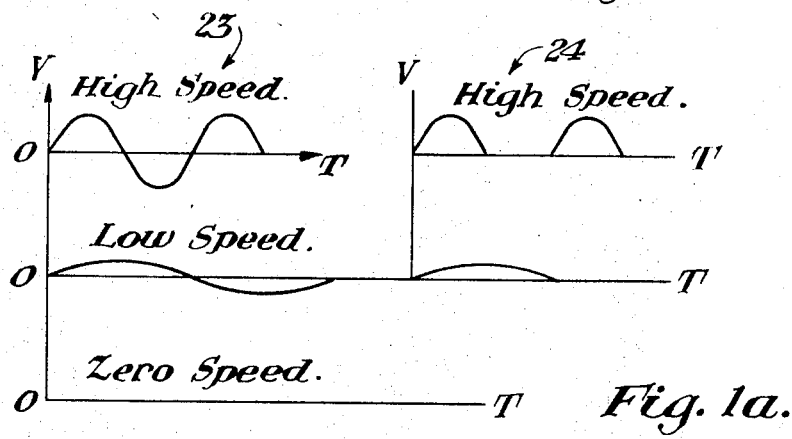

Reference is now made to the drawings, and particularly to FIG. 1 which illustrates an old and well known type of signal generator employing an electromagnetic principle of operation. As shown, a driving source 11, such as an axle driven gear train, is mechanically coupled through shaft 12 to a permanent magnet rotor 13 thereby causing the magnet rotor 13 to rotate at speeds which are directly proportional to the speed of a moving object, such as a railroad vehicle. As shown, the permanent magnet rotor 13 is cooperatively disposed in association with an electromagnetic stator generally characterized by numeral 15. The stator 15 includes a suitable coil 16 encompassing the intermediate portion of a C-shaped magnetic core member 14. It will be appreciated that the change of flux produced by the rotation of the permanent magnet rotor 13 induces a voltage in coil 16 having an amplitude and frequency directly proportional to the angular speed of the shaft 12. The respective ends of coil 16 are shown connected by leads 17 and 18 to leads 21 and 22 respectively which, in turn, are connected to a suitable A.C. voltmeter.

The set of curves 23 in FIG. 1a represents the voltage output level which is generated in coil 16 at various vehicular speeds, and the set of curves 24 represents the generated output signals after rectification. It is quite evident that when the vehicle is moving at a relatively high speed, the amplitude of the signal voltage is sufficiently large so that detection is easily and readily accomplished. However, as the speed of the vehicle is reduced, it will be noted that the amplitude and frequency of the voltage signal are proportionally reduced so that detection of the exact speed becomes increasingly difficult to discern. In addition to the problem of measuring low speed voltage amplitudes, it is impossible to distinguish between a generator failure and zero vehicle speed. For example, if coil 16 should fail by becoming open-circuited, a zero speed indication, namely, no voltage output, would be present on leads 17 and 18 even though the vehicle is in motion. Such operation is not only undesirable but also intolerable in automatic vehicle control systems.

It is, of course, well known that the amplitude of the output signal produced in coil 16 depends upon the number and rate at which the magnetic lines of flux are cut by the rotating permanent magnet rotor 13. The amplitude of the low speed output signal could, of course, be increased by enlarging the size of the permanent magnet rotor 13, thereby increasing the total amount of magnetic flux lines passing through the core 14. While this would obviously result in higher voltages to be induced in coil 16, namely, produce a greater output amplitude level, such an arrangement not only would become quite costly but also would increase the complexity of the mechanical layout of the signal generator. Problems such as these, therefore, give rise to the signal generator of the present invention which provides a solution to the adverse shortcomings which are common to such previously known devices.

Figure 2:
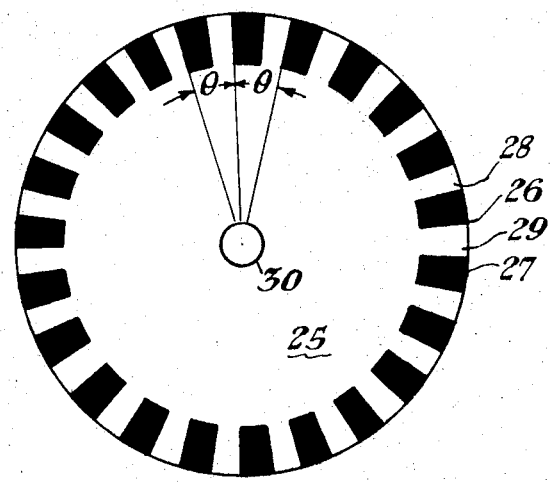
FIG. 2 depicts a surface plan view of one type of a rotor which may be used in practicing the present invention.

Reference is now made to FIG. 2 which depicts a surface top plan view of a preferred type of disc rotor employed in practicing the present invention. The rotor which is characterized by numeral 25 is shown in this FIG. 2 to be circular in shape and possesses rectangular or trapezoidal opaque regions, such as blackened regions 26 and 27. These opaque regions are uniformly distributed, i.e., they are equally angularly displaced as illustrated by the angles $\theta$ in FIG. 2 about the circumference of the disc rotor 25. As shown, the rotor 25 includes regions of high translucence, such as, transparent regions 28 and 29, which are interposed between the opaque regions 26 and 27 to form alternate opaque and transparent regions about the periphery of the disc rotor 25. A circular aperture or hole 30 is shown centrally located in rotor 25 for accommodating a suitable drive shaft, as will be described presently. Although the rotor 25 is shown to be disc-shaped, it is understood that other rotor configurations, such as cylindrical-shaped rotors as well as other shapes may be equally well employed in practicing the present invention which is to be described more fully hereinafter. Further, while the opaque regions on the rotor 25 are shown to be substantially rectangular in shape, it should be noted that other patterns such as circles, triangles, etc. may be used with equal success. In actual practice, the rotor 25 utilizes a total of 144 opaque regions; however, a greater or lesser number of opaque regions may obviously be employed.

Figure 3:
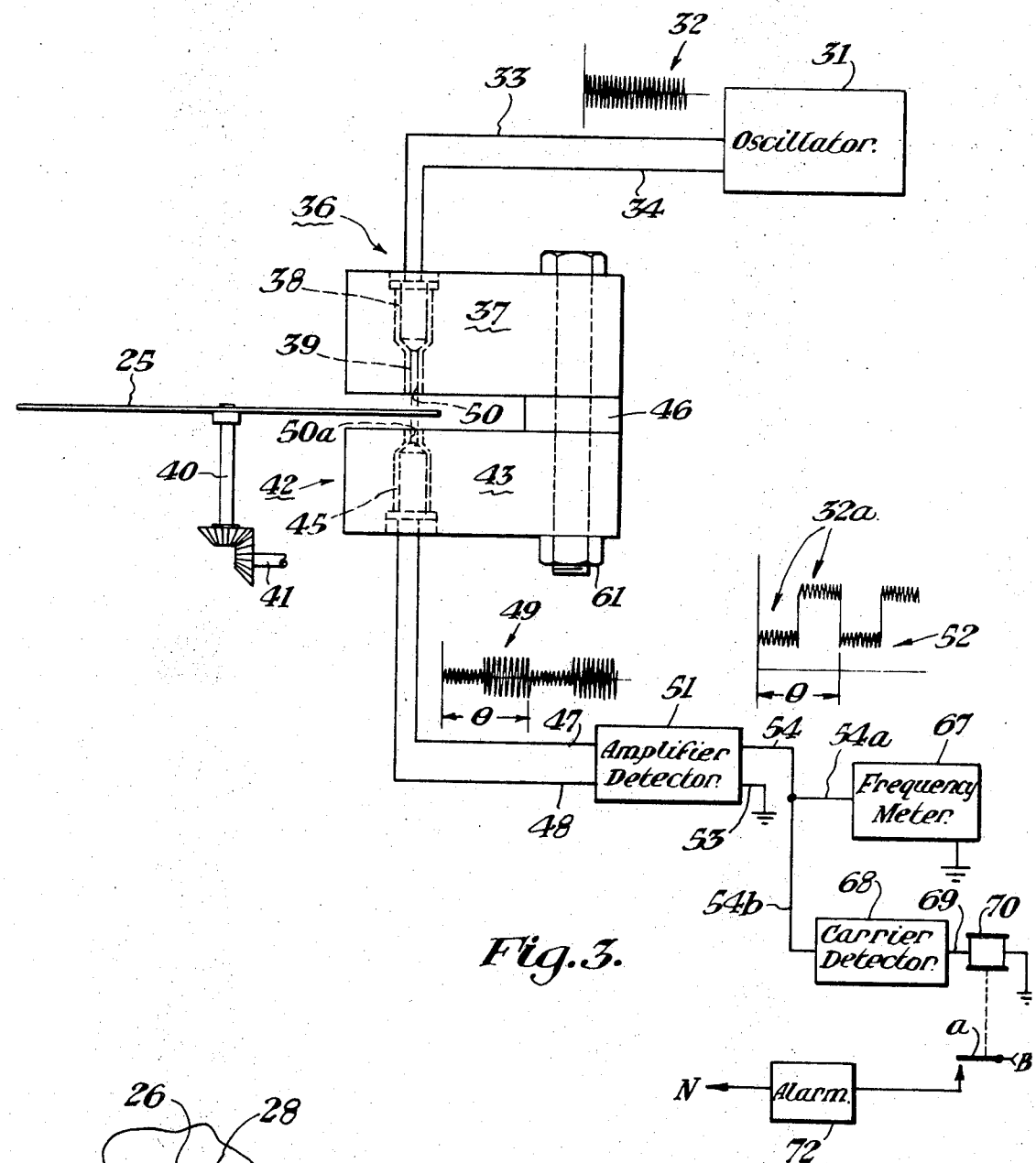
FIG. 3 shows a preferred embodiment of the present invention in partial schematic and block diagram form, with an edge view of the rotor species of FIG. 2.

Let us now refer to FIG. 3, wherein the various details of the signal generator embodying the present invention are shown. A suitable oscillator 31 such as a conventional type of free-running multivibrator provides an excitation signal source for energizing an appropriate light-emitting device which will presently be described. The multivibrator 31 produces an output waveform of the type as illustrated by character 32, preferably having a frequency between 25 to 100 kHz. which is within the RF frequency range and is employed as a carrier frequency. The oscillator 31 is shown connected to the input of a light-emitting transmitting device 36 by leads 33 and 34. The previously mentioned light-emitting device 38 is preferably an asymmetrical photoconductive transducer such as General Electric infrared light-emitting diode SSL-4 which is lodged or positioned in a metallic casing 37 of light-emitting transmitting device 36. The light-emitting diode 38 produces radiant energy in the form of light rays, such as ray 39, which pass through a suitable aperture, such as circular opening 50, located in the underside of casing 37. Thus, it will be seen that the light-emitting transmitting device 36 provides a high frequency radiant energy source wherein the light rays are interrupted in accordance with frequency of the carrier signal 32.

In viewing FIG. 3 it will be noted that the rotor 25 is fixedly secured to drive shaft 40. As shown, one end of the shaft 40 is coupled through hole 30 of rotor 25 while the other end of shaft 40 is suitably geared and rotatably driven by vehicle axle 41. The rotor 25 is arranged to have its peripheral edge disposed directly beneath the circular opening 50 of the transmitting device 36 so that the light rays 39 impinge upon the opaque and translucent regions 26, 27 and 28, 29, respectively.

It will be noted in viewing FIG. 3 that a transducing device 42 is disposed directly beneath the light-emitting transmitting device 36. The transducing device 42 includes a suitable casing 43 having a circular opening 50a in the upper surface of the casing 43. As shown, the opening 50a is in direct alignment with the opening 50 so that light rays passing through rotor 25 are received by the transducing device 42. The transducing device 42 is shown to include a suitable light-detecting means 45, such as, a photosensitive transistor. It is advantageous to employ the transistor 45 to receive and convert the radiant energy to electrical energy since the transistor is an active element which provides an amplification factor or gain. It will be noted that the opening 50a is dimensionally identical to the opening 50 so that little, if any, light losses occur due to sporadic diffusion. As shown, the transducing device 42 and the light-emitting transmitting device 36 are separated by a suitable spacer 46 so that an optical air gap exists between casings 37 and 43. It will be appreciated that the thickness of the spacer 46 determines the width of the air gap between transducing device 42 and light-emitting transmitting device 36. As shown, the light-emitting transmitting device 36, spacer 46, and transducing device 42 are securely held together by any suitable fastening means, such as nut and bolt 61.

Figure 3A:
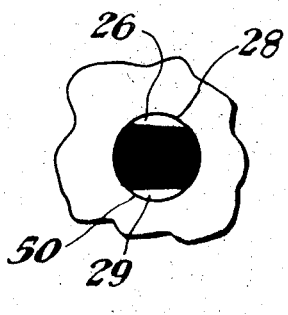
FIG. 3a illustrates a fragmentary view of the relationship between the openings in either the casing of the light-emitting transmitting device or the casing of the transducing device with respect to a signal opaque region of the rotor of FIG. 1.

Thus, it will be appreciated that when the vehicle is moving, the rotor 25 is driven by shaft 40 due to the rotation of the vehicle axle or driving member 41. Accordingly, the rotation of rotor 25 causes the light rays, such as rays 39, emitted by the diode 38 to be chopped, that is, optically impeded, in accordance with the speed of the moving vehicle. That is, the carrier-excited radiant energy coming through opening 50 of casing 37 of light-emitting transmitting device 36, will be passed by translucent regions of rotor 25, such as regions 28 and 29 of FIG. 2 and will be blocked by opaque regions of rotor 25, such as regions 26 and 27 of FIG. 2. However, it will be noted that when an opaque region is aligned and centered with respect to opening 50 there is still a relatively small amount of light or radiant energy which passes through the rotor 25, the purpose of which will be described presently. Let us refer now to FIG. 3a wherein the physical relationship between an opaque region 26 and the hole 50 is shown. It will be noted that the hole 50 is slightly larger than the opaque region 26 so that a small amount of light always passes through the rotor 25, namely, through translucent regions 28 and 29. Such an arrangement allows zero vehicle speed detection to be obtained since a given amount of carrier-excited light passes through the rotor 25 even when an opaque region, such as 26, is in direct alignment with opening 50 as shown in FIG. 3a.

Accordingly, when the vehicle is moving and the rotor 25 is rotating, the transducing device 42 receives modulated radiant energy signals or carrier-excited pulses through opening 50a to light detector 45. The light detector 45 which, as previously stated, preferably is a photosensitive transistor, converts the received radiant energy signal or light pulses into corresponding electrical pulses such as modulated signals 49 appearing on output leads 47 and 48. It will be appreciated that in the absence of an electrical failure, the photosensitive transistor 45 produces an unmodulated carrier-excited signal on leads 47 and 48 whenever the vehicle is not moving and the rotor 25 is stationary. That is, since light is always permitted to pass through the rotor 25, even when an opaque region is directly over the opening 50a as shown in FIG. 3a, a continuous unmodulated signal having an amplitude proportional to the amount of incident light is produced by transistor 45 on leads 47 and 48. As shown, the leads 47 and 48 are directly connected to the input of an amplifier detector 51. The detector 51 may be a conventional type of active level detecting means which produces an amplified output of the applied input signal. For example, when modulated signals 49 appear on leads 47 and 48, the detector 51 produces an output such as signals 52 on leads 53 and 54 which is representative of the amplified envelope of the oscillating pulse train created by the passage of the translucent and opaque regions of the moving rotor 25. It will be noted that the number of pulses per revolution is directly proportional to the angular distance in radians represented by the angle $\theta$ between the leading edges of any two consecutive opaque regions on rotor 25. That is, the further the separation between the opaque regions the lesser the number of pulses per revolution will be produced and vice-versa. Further, it will be appreciated that the pulse frequency is representative of the speed of the moving vehicle, and hence zero frequency is indicative of zero vehicular speed.

A study of curve 52 reveals that the general shape of the pulse train produced by the amplifier detector 51 is a square-wave signal having superimposed thereon a high frequency carrier which is depicted by the fluctuations 32a appearing on the square-wave signal. The presence of these carrier fluctuations and their importance will now be described. A review of the prior art reveals that previous pulse generators of the tachometer type fail to provide a reliable method of determining whether the lack of an output signal is caused by zero vehicle speed or by some electrical circuit failure. Therefore, in such previous arrangements a zero reading was an element of uncertainty which is completely intolerable in an automatic vehicle controlling system. In the present invention, this uncertainty is removed due to the employment and presence of the superimposed carrier signal 32a on the square-wave signals 52. This carrier signal 32a is constantly present on the leads 53 and 54 even in the absence of any modulation and is continually detected by a carrier detector 68 which is electrically connected to the output of detector 51 by lead 54b. The carrier detector may be of any conventional type which includes a high pass filter for effectively passing waves about a given frequency, such as 25 kHz. and above, and for effectively blocking waves below a certain frequency. It will be understood that while not shown separately, there is preferably at least one amplifier stage included within the carrier detector 68 for amplifying the carrier signal.

As shown, the carrier detector 68 is provided with an output lead 69 which is connected to one end of the winding of a relay 70, the other end of which is connected to ground. Accordingly, the relay 70 will remain energized as long as an output is present on lead 69. That is, when the signal generator is functioning properly, the presence of the carrier signal even at zero velocity is detected by the carrier detector 68 so that relay 70 remains energized. Thus, when a failure in any circuit such as the detector or oscillator circuit occurs or the diode 38 or transistor 45 fail, the carrier signal would no longer be detected and the relay 70 would become deenergized so that a warning circuit is completed from the positive battery terminal B over the closed contact a of the relay 70 and thence to the alarm 72 and the negative battery terminal N. As shown, the relay 70 controls heel contact a which is directly connected to the positive terminal B of a suitable direct current supply source. The back contact point is shown connected by a suitable alarm device 70 to the negative terminal N of the supply source. The alarm 70 may be any conventional warning device, such as, an audio or audio-visual type. Therefore, since the carrier signal is normally present at all times, namely, whether the vehicle is at operating speeds or a zero velocity, then the absence of the carrier signal may be employed for indicating circuit failure and for monitoring system integrity. Accordingly, a failure which destroys the system integrity is readily detected so that necessary repairs may be immediately initiated for restoring normal operation.

As shown, a suitable frequency meter 67 is electrically connected to the amplifier detector 51 by leads 54a. The frequency meter 67 may include a plurality of suitable low-pass filters which establish the various speed ranges common to the vehicle speed control system. Thus, the pulse train 52, when delivered to the frequency meter 67 produces an indication which is representative of the angular rotation of the rotor 25 and, in turn, the speed of the moving vehicle. Further, it will be seen that the magnitude of the modulated output signal produced by the amplifier detector 51 is independent of the rotating speed of the rotor 25 so that other ancillary equipment such as amplitude limiters, etc., need not be employed. When the rotor 25 comes to a complete stop due to the stopping of the vehicle, the reference level of the carrier signal may vary between the maximum and minimum values of the envelope of the modulating signal.

Accordingly, it will be appreciated that by employing the unique signal generator described above, a more reliable and efficient overall system may be realized since it is possible to readily discern between circuit failures and zero vehicle speed.

Further, while my invention has been described with reference to a vehicle speed control system, it should be understood that this invention may be employed in other environments where it is desirable to accurately measure the angular speed of rotating moving objects.

Obviously, certain modifications and variations of the invention as hereinbefore set forth may be made without departing from the spirit and scope thereof, it is intended that all matter contained in the above description or shown in the accompanying drawings shall be interpreted as illustrative and not in a limiting manner.

I claim:

1. A signal generator for producing electrical signals in accordance with the angular velocity of a rotating element and including in combination:
    (a) a rotor having peripheral opaque and translucent regions, said rotor coupled to the rotating element,
    (b) at least one transmitting device having an input, an A.C. signal source to provide an A.C. signal on said input of said transmitting device, said transmitting device producing a light ray output signal which is initially amplitude modulated at a frequency proportional to that of said A.C. signal,
        said rotor positioned adjacent said transmitting device and further amplitude modulating said light ray output signal of said transmitting device upon impingement with said rotor in accordance with the rotation of said rotor, said initially amplitude modulated light ray signal transmitted without said further modulation whenever said rotor is motionless,
    (c) at least one transducing device positioned adjacent to and separated from said transmitting device by said rotor for receiving and converting said further modulated light ray signal and said light ray signal without further modulation into corresponding electrical signals with and without further modulation,
    (d) and means coupled to said transducing device and including first means for detecting the envelope of said further modulated electrical signal to thereby provide an indication of angular velocity of said rotating element and including second means for detecting the frequency of said initially modulated electrical signal during and in the absence of rotational movement of said rotating element to thereby provide an indication that said generator is operating properly.

2. A signal generator for producing electrical signals in accordance with the angular velocity of a rotating element and including in combination:
    (a) a rotor coupled to the rotating element, said rotor possessing optical properties such that there exists at least one peripheral region of low translucence and at least one peripheral region of high translucence when in the presence of radiant energy,
    (b) at least one transmitting device having means for transmitting light rays through an opening in said transmitting device, said transmitting device having an input, an A.C. signal source to provide an A.C. signal on said input of said transmitting device, said transmitting device producing light rays which are initially amplitude modulated at a frequency proportional to the frequency of said A.C. signal, said transmitting device positioned adjacent said rotor so that said transmitted initially modulated light rays impinge said rotor and are further modulated in accordance with the rotational movement of said rotor and particularly in accordance with the rotation of the low and high translucent peripheral regions, and so that said initially amplitude modulated light ray signal is transmitted without said further modulation whenever said rotor is motionless,
    (c) at least one transducing device having means for receiving said initially modulated and further modulated light ray signals through at least one opening in said transducing device and for converting said initially modulated and further modulated light ray signals into corresponding electrical signals, said transducing device positioned adjacent said rotor, said rotor interposed between said transmitting device and said transducing device, said transducing device having an output upon which said corresponding further modulated electrical signals appear in accordance with the movement of said rotor and particularly in accordance with rotational movement of the low and high translucent peripheral regions and upon which said corresponding initially modulated electrical signals appear whenever said rotor is motionless,
    (d) and means coupled to said output of said transducing device and including first means for detecting the envelope of said further modulated electrical signal to thereby provide an indication of angular velocity of said rotating element and including second means for detecting the frequency of the initially modulated electrical signal during and in the absence of rotational movement of said rotating element to thereby provide an indication that said generator is operating properly.

3. A signal generator as defined in claim 2, wherein said rotor includes a plurality of opaque regions located on the periphery of said rotor and lying at an angle to the axis of rotation.

4. A signal generator as defined in claim 3, wherein said rotor is circular in shape and said plurality of opaque regions lie radially on the circumference of said rotor.

5. A pulse generator as defined in claim 4, wherein each of said plurality of opaque regions is substantially rectangular in shape.

6. A signal generator as defined in claim 3, wherein the area of each of said opaque regions, when encompassed by the opening in said transmitting device, is less than the area of the opening in said transmitting device so that a minimum amount of light rays is always transmitted through said rotor.

7. A signal generator as defined in claim 3, wherein the area of each of said opaque regions, when encompassed by the opening in said transducing device, is less than the area of the opening in said transducing device so that a minimum amount of light rays is always received by said transducing device.

8. A signal generator as defined in claim 2, wherein said initially modulated light rays are transmitted by a light-emitter diode.

9. A signal generator as defined in claim 2, wherein said initially modulated and further modulated light ray signals are received by a photosensitive transistor.

10. The pulse generator of claim 2, wherein said transmitting device and said transducing means are separated by a dimension greater than the thickness of said rotor.

11. The pulse generator of claim 2, wherein the rotating element is a vehicle axle which is mechanically coupled to said rotor.

12. A signal generator as defined in claim 4, wherein the angular velocity and circumferential displacement of said opaque regions determine the frequency of said modulated electrical signals.

13. A signal generator as defined in claim 12, wherein said opaque regions are equally radially displaced around the periphery of said rotor.

14. A pulse generator for producing electrical pulses and including in combination:
  (a) a circular rotor possessing optical properties such that there exists at least one peripheral region of low translucence and at least one peripheral region of high translucence when in the presence of light rays, said low and high translucence regions lying radially on the entire circumference of said rotor, and being rectangular in shape and equally angularly displaced with respect to each other,
  (b) at least one light-emitting transmitting means having an input, an A.C. signal source to provide an A.C. signal on said input of said transmitting means, said transmitting means including a light-emitting diode for producing light rays initially amplitude modulated at a frequency proportional to the frequency of said A.C. signal through an opening in said light-emitting transmitting means, said light-emitting transmitting means positioned adjacent said rotor so that said initially modulated light rays from said light-emitting diode impinge said rotor and are further amplitude modulated in accordance with the rotation of said rotor, and particularly in accordance with the rotation from said peripheral regions of low translucence to and through said peripheral regions of high translucence caused by rotational movement of said rotor, said light rays remaining initially modulated when said rotor is motionless,
  (c) at least one transducing means for receiving said initially modulated and further modulated light rays through at least one opening in said transducing means and having means to convert said initially modulated and further modulated light rays into corresponding initially modulated and further modulated electrical signals, said transducing means positioned adjacent said rotor, said rotor being interposed between said transmitting means and said transducing means such that said initially modulated and further modulated light rays enter said opening in said transducing means, said corresponding electrical signals appearing on an output of said transducing means,
  (d) and means coupled to said output of said transducing means which includes first means for detecting the envelope of said further modulated electrical signal so that rotational movement of said rotor may be determined and includes second means to detect the frequency of said initially modulated electrical signal during and in the absence of rotational movement of said rotor to thereby provide an indication of the integrity of the pulse generator.

15. A pulse generator as defined in claim 14, wherein the area of said opaque regions, when encompassed by the opening in said light-emitting transmitting means is less than the area of the opening in said light-emitting transmitting means so that a minimum amount of light rays are always transmitted through said rotor.

16. A pulse generator as defined in claim 14, wherein the area of opaque regions, when encompassed by the opening in said transducing means, is less than the area of the opening in said transducing means so that a minimum amount of light rays are always received by said transducing means.

17. A pulse generator as defined in claim 14, wherein said light-emitting transmitting means and said transducing means are separated by a dimension greater than the thickness of said rotor.

18. A pulse generator as defined in claim 14, wherein said rotation movement is initiated by a vehicle axle which is mechanically coupled to said rotor.

19. A pulse generator as defined in claim 14, wherein the angular velocity and circumferential displacement of said opaque regions determine the frequency of said further modulated light rays.

20. A pulse generator as defined in claim 14, wherein said initially modulated and further modulated light rays are received by a photosensitive transistor.

References Cited

UNITED STATES PATENTS

| | | | |
|---|---|---|---|
| 2,769,949 | 11/1956 | Stratton | 324—70 |
| 3,365,639 | 1/1968 | Jacobs | 250—231 |

MICHAEL J. LYNCH, Primary Examiner

U.S. Cl. X.R.

250—231; 340—253